(12) United States Patent
Wicks

(10) Patent No.: US 11,229,933 B2
(45) Date of Patent: Jan. 25, 2022

(54) MULTIFUNCTION MOLECULAR ENERGIZER APPARATUSES AND METHODS OF USING SAME

(71) Applicants: George G. Wicks, Aiken, SC (US); Applied Research Center, Inc., Aiken, SC (US)

(72) Inventor: George G. Wicks, Aiken, SC (US)

(73) Assignees: George G. Wicks, Aiken, SC (US); Applied Research Center, Inc., Aiken, SC (US)

( * ) Notice: Subject to any disclaimer, the term of this patent is extended or adjusted under 35 U.S.C. 154(b) by 0 days.

(21) Appl. No.: 17/076,473

(22) Filed: Oct. 21, 2020

(65) Prior Publication Data

US 2021/0346926 A1 Nov. 11, 2021

Related U.S. Application Data

(60) Provisional application No. 63/020,632, filed on May 6, 2020.

(51) Int. Cl.
| | | |
|---|---|---|
| H05B 6/64 | (2006.01) | |
| H05B 6/80 | (2006.01) | |
| B09B 3/00 | (2006.01) | |

(52) U.S. Cl.
CPC .......... B09B 3/0083 (2013.01); B09B 3/0075 (2013.01); H05B 6/6491 (2013.01); H05B 6/80 (2013.01); *H05B 2206/045* (2013.01)

(58) Field of Classification Search
CPC ......... A61L 11/00; B09B 3/00; B09B 3/0075; B09B 3/0083; H05B 6/784; H05B 6/78; H05B 2206/046; H05B 2206/045; F23G 7/063; F23G 2204/203

USPC ........ 219/678, 679, 680, 759, 686; 522/161, 522/159, 158; 523/300; 210/748.07, 210/188, 243, 251, 259, 768; 524/492, 524/495; 521/41

See application file for complete search history.

(56) References Cited

U.S. PATENT DOCUMENTS

| | | | |
|---|---|---|---|
| 5,843,287 A | 12/1998 | Wicks et al. | |
| 5,891,011 A | 4/1999 | Wicks | |
| 5,968,400 A | 10/1999 | Wicks et al. | |
| 6,262,405 B1 * | 7/2001 | Wicks | A61L 11/00 |
| | | | 219/679 |
| 6,407,144 B1 * | 6/2002 | Fliermans | C08J 11/105 |
| | | | 521/41 |

(Continued)

OTHER PUBLICATIONS

Walters, R. T., Burket, P. and Wicks, G. G., "Temperature Programmed Desorption Using an Off-the Shelf Hybrid Microwave Oven", in "Materials Innovations in an Emerging Hydrogen Economy", pp. 211-219.(2009).

(Continued)

*Primary Examiner* — Quang T Van
(74) *Attorney, Agent, or Firm* — Todd A. Serbin; Nexsen Pruet, LLC

(57) ABSTRACT

A treatment system, including at least one of: a solid waste material treatment module with the capabilities of disinfecting, sterilizing and/or destruction of potentially hazardous materials; a liquid waste material treatment module; and, a gaseous waste material treatment module, wherein the solid, liquid and gaseous material treatment modules can be used separately or selectably interconnectable to each other.

11 Claims, 6 Drawing Sheets

(56) References Cited

U.S. PATENT DOCUMENTS 6,420,457 B1     7/2002   Wicks et al.
6,534,754 B2     3/2003   Schulz et al.

OTHER PUBLICATIONS

Wicks, G. G., Clark, D.E., Schulz, R.L. and Folz, D.C , "Microwave Technology for Waste Management Applications—Disposition of Electronic Circuitry," Microwaves: Theory & Application in Materials Processing III. Ceramic Transactions, pp. 1-14 (1995).

Schulz. R.L., Fathi, Z., Clark. D.E., and Wicks G.G., "Microwave Processing of Simulated Nuclear Waste Glass," published in Microwave Processing of Materials, Ceramic Transactions, vol. 21, pp. 451-458 (1991).

Schulz, R.L., Folz, D.C , Clark, D.E., Schmidt, CJ. and Wicks, G. G., "Microwave Treatment of Emissions from Waste Materials," Materials Research Society Symposium Proceedings, vol. 430, pp. 549-554 (1996).

Wicks, G.G., Clark, D.E., and Schulz, R.L., "Microwave Technology for Waste Management Applications: Treatment of Discarded Electronic Circuitry," pp. 1-19 (1997).

Wicks, G.G., Schulz, R.L. and Clark, D. E., "Microwave Technology for Waste Management Applications Including Disposition of Electronic Circuitry," American Ceramic Society Annual Meeting, Cinn., OH, pp. 1-11 (1998).

Schulz, R.L., Wicks, G.G. and Clark, D.E., "Microwave Remediation of Emissions Resulting from Treatment of Electronic Components", pp. 1-9, retrieved from https://sti.srs.gov/fulltext/ms2000197/ms2000197.html (Feb. 2, 2021).

Wicks, G. G., Schulz, R.L. and Clark, D.E., "Microwave Remediation of Hazardous and Radioactive Wastes", ,pp. 1-6, retrieved from https://sti.srs.gov/fulltext/ms9900762/ms9900762.html (Feb. 2, 2021).

Wicks, G. G., Schulz, R.L., and Clark, D.E. "Hybrid Microwave Technology: A New Technology for Destruction and Recycling Discarded Electronic Circuitry and Reclamation of Precious Metals", Westinghouse Savannah River Company, WRSC-MS-99-00693 (1999).

\* cited by examiner

MULTIFUNCTION MOLECULAR ENERGIZER APPARATUSES AND METHODS OF USING SAME

RELATED APPLICATION

This application claims the benefit of priority under 35 U.S.C. § 119(e) of U.S. Provisional Patent Application No. 63/020,632 filed May 6, 2020, the contents of which are incorporated herein by reference in their entirety.

FIELD OF THE INVENTION

The present invention, in some embodiments thereof, relates to the materials treatment and/or disposal industries and, more particularly, but not exclusively, to equipment and methods for providing materials treatments. This includes disinfection, and/or sterilization, and/or destruction of potentially hazardous solids, liquids and gases, and equipment and components within these efforts

BACKGROUND OF THE INVENTION

In the late 1990's and early 2000's, hybrid microwave treatment of materials was studied for remediation of a variety of waste materials. This early work was conducted by a team from the Savannah National River Laboratory (SRNL) in Aiken, S.C. and the University of Florida in Gainesville, Fla.

However, these efforts were merely exploratory in the technology and did not result in practical or workable solutions or products in the waste material treatment field.

Previous work in this field is represented by U.S. Pat. No. 6,534,754 to Schulz, et al.; U.S. Pat. No. 6,420,457 to Wicks, et al.; U.S. Pat. No. 6,407,144 to Fliermans, et al.; U.S. Pat. No. 6,262,405 to Wicks, et al.; U.S. Pat. No. 5,968,400 to Wicks, et al.; U.S. Pat. No. 5,843,287 to Wicks, et al.; and, U.S. Pat. No. 5,891,011 to Wicks.

SUMMARY OF THE INVENTION

According to an aspect of some embodiments of the present invention, there is provided a treatment system, comprising at least one of: a solid waste material treatment module; a liquid waste material treatment module; and, a gaseous waste material treatment module, wherein the solid, liquid and gaseous waste material treatment modules, can be used separately or selectably interconnectable to each other, as part of an integrated system.

In an embodiment of the invention, the system further comprises alternative power sources for powering at least the hybrid microwave including at least one of solar, wind, geothermal, hydroelectric, and/or organic waste. This allows unique applications, especially internationally in areas that do not always have power available, including many third world countries In an embodiment of the invention, the system is combined with at least one other of system serially and/or in parallel.

In an embodiment of the invention, the system further comprises at least one software-programmed controller adapted for tailoring ramp-up/ramp-down times, implementing radiation and/or heat intensity application profiles (optionally in conjunction with one another), and/or controlling soaking cycle performance of the In an embodiment of the invention, the In an embodiment of the invention, the controller is remotely located with respect to the hybrid microwave.

According to a further aspect of some embodiments of the present invention, there is provided a comprehensive, modular treatment system using standard or alternative power sources, i) wherein the user is separated from the radiation, heat, off-gases and/or other potentially harmful substances or effects during system operation, and ii) wherein multiple forms of matter can be treated with the same hybrid microwave system, optionally simultaneously, including a) solids; and/or b) flowing liquids; and/or c) gases, including off-gases from a) and/or b).

According to a further aspect of some embodiments of the present invention, there is provided treatment system for treating solids, comprising: a hybrid microwave, configured for treatment of metals, composites, ceramics, glasses, polymers and all other types of solids; wherein hybridization allows treatment of solids that do not generally react well with conventional microwaves by first using at least one susceptor, which heat the materials radiantly to a higher temperature in which they can then couple with the microwaves energy, and wherein the at least one susceptor is fabricated into the walls of a 'box' surrounding the material to be treated to begin the heating process and allow all types of solids to be used.

According to a further aspect of some embodiments of the present invention, there is provided a treatment system for treating a flowing fluid, comprising: a hybrid microwave; a pair of specially constructed ports acting as an inlet and an outlet to the interior of the microwave; tubing passing through the specially constructed ports in a manner preventing microwave leakage, and either directly or can also be made into a coil inside the unit, whose diameter and number of loops can be used to further control the resident time of the liquid to be treated; and an external pump system that allows the flow rates into and out of the microwave unit to be controlled, monitored and recycled, as desired.

According to a further aspect of some embodiments of the present invention, there is provided treatment system for treating off-gases from a hybrid microwave, comprising: a mass of susceptor in the form of a bed or within tubing/piping or in a retort, through which off-gases are passed, wherein the susceptor absorbs electromagnetic energy and converts it to heat for cleansing/treating the off-gases along with direct coupling of microwaves with the gas molecules and the potential 'microwave effect', and, wherein off-gas treatment is optionally conducted in the top, inside region of the hybrid microwave unit.

According to a further aspect of some embodiments of the present invention, there is provided a method of water purification and/or treatment.

According to a further aspect of some embodiments of the present invention, there is provided a method of reclaiming materials.

According to a further aspect of some embodiments of the present invention, there is provided a method of treating biohazardous, toxic, radioactive, medical and/or chemical wastes.

According to a further aspect of some embodiments of the present invention, there is provided a method of decontamination of materials such as PPE (personal protective equipment), containing potential hazardous bacteria, viruses, etc, thus allowing for decontamination and safe recycling and reuse of the PPE According to a further aspect of some embodiments of the present invention, there is provided a method of pharmaceutical and/or illegal drug disposal.

According to a further aspect of some embodiments of the present invention, there is provided a method of reducing waste material volume.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and images. With specific reference now to the drawings in detail, it is stressed that the particulars shown are by way of example, are not necessarily to scale and are for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
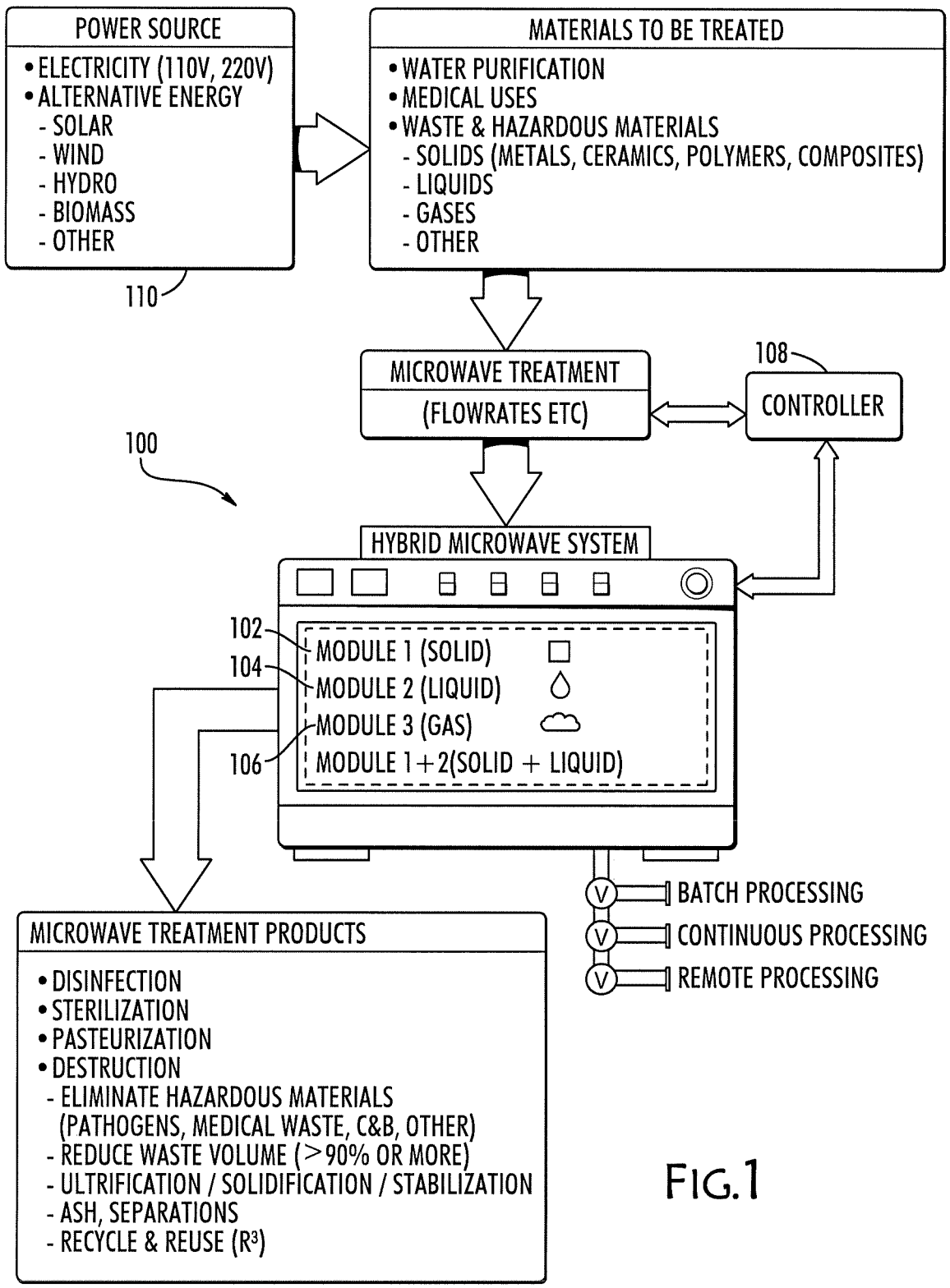
FIG. 1 is a schematic of an integrated, hybrid microwave system, in accordance with an exemplary embodiment of the invention.

The present invention, in some embodiments thereof, relates to the materials treatments and/or disposal industries and, more particularly, but not exclusively, to equipment and methods for providing material treatment.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Generally, the ability to treat waste materials to reduce their volume and/or potentially hazardous effects is important in many fields. The inventions described herein provide exemplary embodiments of "commercial grade", integrated molecular energizer units (e.g. hybrid microwave units) and processing conditions/methodology that allow for new and enhanced capabilities for waste treatment and other applications. In some embodiments of the invention, the equipment described herein is usable to disinfect, sterilize, pasteurize and/or destroy treated materials while also significantly reducing the volume of the treated waste.

Referring now to the drawings, FIG. 1 is a schematic of an integrated, hybrid microwave system 100, in accordance with an exemplary embodiment of the invention. The system 100 includes at least one of a solid material treatment module 102, a liquid material treatment module 104, and a gaseous material treatment module 106, in some embodiments of the invention.

Figure 2:
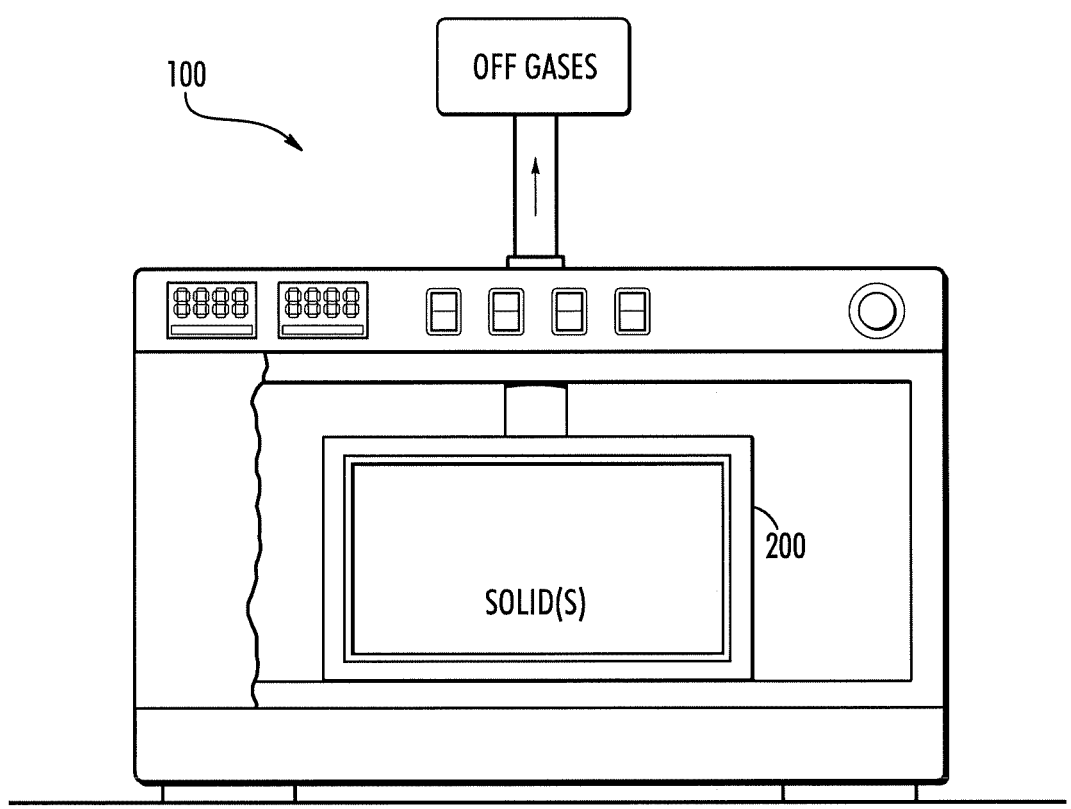
FIG. 2 is a schematic of a solid material treatment module of an integrated, hybrid microwave system, in accordance with an exemplary embodiment of the invention.

In an embodiment of the invention, solids are treating using a hybrid microwave which includes a susceptor box, shown in more detail with respect to FIG. 2. It is conceived that the system 100 uses a commercial grade, hybrid microwave as the base unit including a plurality of magnetron tubes, in contrast to most conventional microwaves, which use only one. Optionally, the system 100 uses 4 or more magnetron tubes but can also be expanded in both size and the number of microwave generators, that is, the system 100 is intended to be scalable.

Figure 3A:
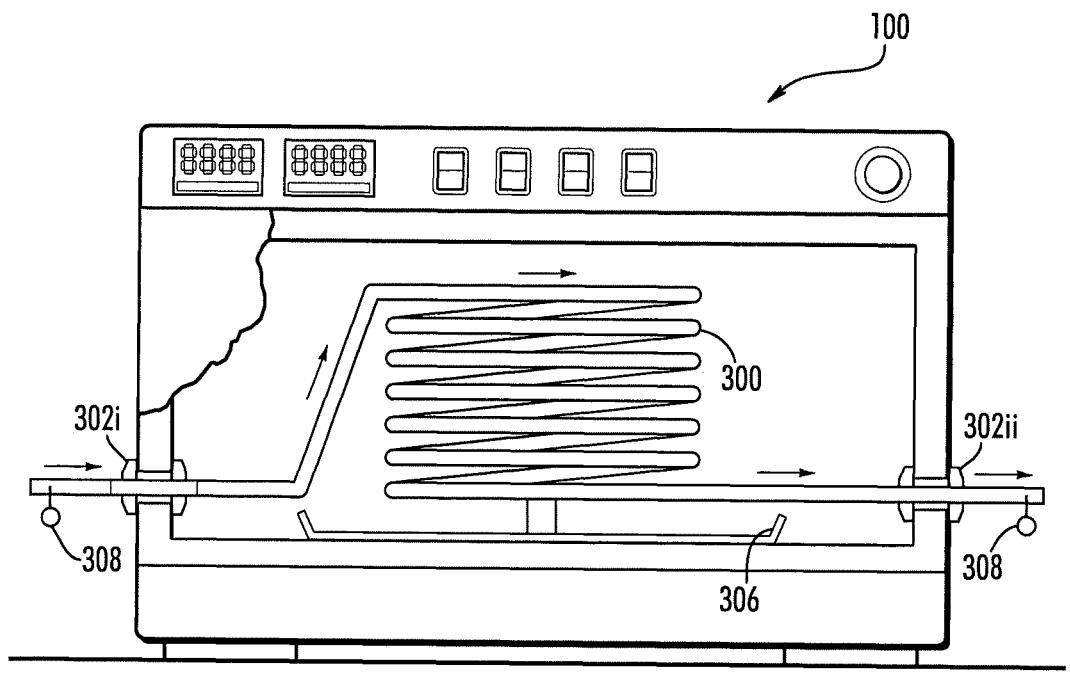
FIG. 3A is a schematic of a liquid material treatment module of an integrated, hybrid microwave system including a vertical coil, in accordance with an exemplary embodiment of the invention.
Figure 3B:
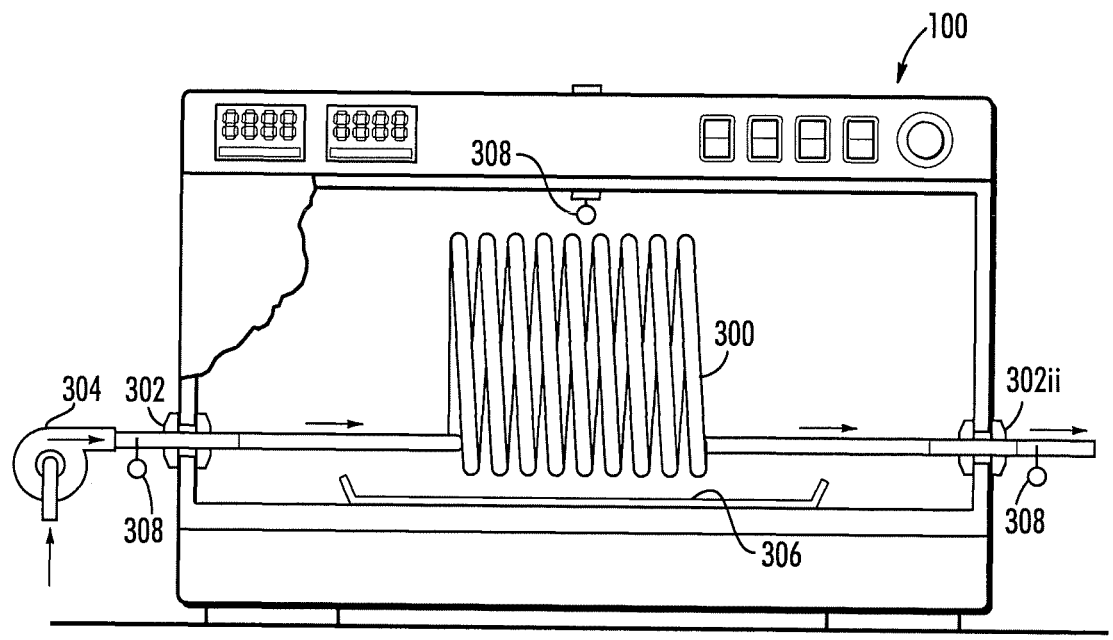
FIG. 3B is a schematic of a liquid material treatment module of an integrated, hybrid microwave system including a horizontal coil, in accordance with an exemplary embodiment of the invention.

The liquid material treatment module 104, shown and described in more detail with respect to FIGS. 3A and 3B, generally provides the ability for liquid materials to enter the system 100, and optionally the susceptor box, for treatment of the liquid while it flows through the system 100. For example, using tubing and/or a coil which enters into the microwave of the system 100 and which contains the flowing liquid therein for treatment.

Figure 4:
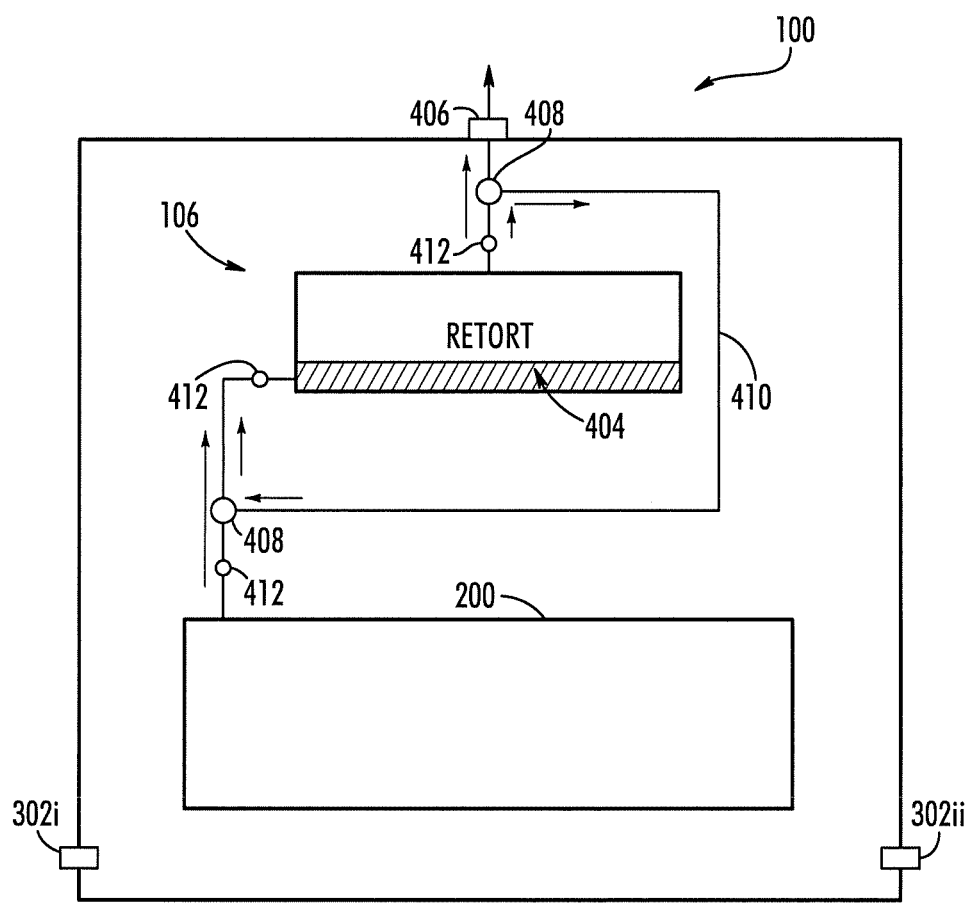
FIG. 4 is a schematic of a gaseous material treatment module an integrated, hybrid microwave system, in accordance with an exemplary embodiment of the invention.

The gaseous material treatment module 106, shown and described in more detail with respect to FIG. 4, generally provides the ability for the system 100 to treat off-gases which are generated from treatment of other materials by the system 100. For example, by venting off-gases through a bed of susceptor material.

It should be understood that the modules 102, 104, 106 are configured for convenient and/or effective attachment and/or removal from each other so that the system 100 is easily configurable to render treatment depending on the materials being treated (solids, liquids, gases, radioactive, pathogens, etc.) and/or the objectives to be achieved using the system 100. For example, one or more of the modules is provided with interlocking and/or counterpart ports for conveying material between them. As another example, mechanical locking mechanisms are used to conveniently attach and detach one or more modules together, such as by using clasps, snaps, zippers, hook and pile fasteners, screws, latches, binders, compression connectors, twisting connectors, and the like.

It should also be understood that at least part or a portion of any of the modules 102, 104, 106 could be shared with one or more of the other modules 102, 104, 106. For example, the susceptor box 200, shown and described in more detail with respect to FIGS. 2 and 6, could be used in the processing of solid, liquid and/or gaseous material separately or concurrently with one another.

In some embodiments of the invention, control of the system 100 is accomplished using at least one specially software-programmed controller 108 capable of, for example, tailoring ramp-up/ramp-down times, implementing radiation and/or heat intensity application profiles (optionally in conjunction with one another), and/or controlling soaking cycle performance of the system 100. Optionally, the controller 108 is located remotely from one or more components of the system 100. In some embodiments, it should be understood that any user operated controls are also located remotely from one or more components of the system, for user/operator safety.

In some embodiments, the system uses alternative energy as a power source 110, for example solar, wind, geothermal, hydroelectric, and/or organic waste such as dung.

In some embodiments of the invention, system 100 is used in serial and/or in parallel with other treatment systems for scaling material treatment and/or to apply different treatment processes and/or effects to materials being treated. Optionally, one or more controllers are used to control the array of treatment systems to achieve desired treatment outcomes.

The system 100 described herein has many uses for waste treatment, law enforcement, homeland security, industry (e.g. de-vulcanization of rubbers), water purification and others. Waste treatment applications are described in more detail below, however, primary features/benefits of using system 100 for waste treatment include enhanced user safety (since the user can be remotely located from the heat and radiation sources), surprising and substantial waste volume reduction, ability to treat waste in-situ (since the system 100 described herein can be portable), use of the same system for biohazardous, medical, toxic, chemical and radioactive wastes as for "regular" and electronics wastes, the ability to use the same system for solid, liquid and gaseous wastes (including treatment of off-gases), use of both heat and microwave radiation for treatment (including extremely high temperature and rapid and selective heating). In some embodiments, selective and/or controlled heating enables the separation of and/or recycling and/or reclaiming of certain materials while reducing and/or eliminating others.

FIG. 2 is a schematic of a solid waste treatment module 102 of an integrated, hybrid microwave system 100 including a susceptor box 200, in accordance with an exemplary embodiment of the invention. This solid treatment module can be used not only for destruction of solid wastes, but also serve as a 'decontamination' chamber as well. Under these conditions the module can be used for decontamination of toxic materials, bacteria, viruses etc, and be used to disinfect, sterilize materials for recycling and reuse, as well as destroying waste materials, as desired. While the system 100 is shown with just the susceptor box 200, it should be understood that in an operative scenario, one or both of the liquid material treatment module 104 or the gaseous material treatment module 106 could also form a part of the system 100, depending on the materials being treated and/or the objectives of the operator.

In an embodiment of the invention, solid materials formed from metals, composites, ceramics, glasses, polymers and others are placed in the susceptor box 200 for treatment by the hybrid microwave system 100, wherein heat and/or radiation are sufficient for successfully treating the solid materials. It should be understood that hybridization allows treatment of solids that do not generally react well with conventional microwaves by first using susceptors, which heat the materials radiantly to a higher temperature in which they can then couple with the microwaves energy. In an embodiment of the invention, the susceptors are fabricated into the walls of the susceptor box 200, which surrounds the material to be treated to begin the heating process. Not shown, but optionally forming a part of the solid waste treatment module 102, is at least one controller 108 for controlling operation of the system 100.

FIGS. 3A and 3B are schematics of a liquid waste treatment module 104 of an integrated, hybrid microwave system 100, in accordance with an exemplary embodiment of the invention. In an embodiment of the invention, flowing liquids are treated in the system 100 by passing the liquid through a coil 300 which passes through the hybrid microwave. Optionally, the coil 300 passes through a susceptor box 200 (not shown). In an embodiment of the invention, the coil 300 is adapted to suit the treatment required by the liquid material. For example, the diameter of the coil (tubing) and/or the number of loops can be used to control the resident time of the liquid to be treated (as an example, the more loops, the longer possible time of treatment exposure). A pump system 304 is optionally used to control the liquid material volume and/or flow rates into and out of the system 100, which also could be used to affect treatment times. Optionally, return tubing is provided to re-cycle liquid material through the system 100. Optionally, the tubing is used to connect more than one system 100 together.

In an embodiment of the invention, a catch pan 306 is placed under the coil 300 to catch any leakage of liquid materials.

The system 100 uses at least one specially constructed port 302*i* as an inlet/passage from the exterior of the microwave to the interior portion and through which the coil 300 runs. Optionally, there is an inlet port 302*i* and an outlet port 302*ii*. In some embodiments, the ports 302*i*, 302*ii* are metal tubes or are connected to metal tubes located on the outside of the microwave. In an embodiment of the invention, these ports are placed in locations within the microwave to prevent significant leakage of microwave radiation from the hybrid microwave. That is, in some embodiment of the invention the locations were determined by evaluating the scattering of microwave energy inside the hybrid microwave and the ports were placed in the least radiation affected areas. These ports can also be used for other functions, such as introducing inert atmospheres to control redox conditions while processing. In some embodiments of the invention, ports are closed, capped or blocked when not in use. For example, a spring-loaded, hinged flap or cap automatically closes over the port when the coil/tubing 300 is not inserted therethrough. Optionally, a manually operated cap is placed over a port when not in use.

In some embodiments of the invention, at least one sensor 308 is provided to the system 100 to measure various operative aspects of the system. For example, at least one sensor 308 could be positioned near a port 302i/302ii in order to monitor radiation leakage from the hybrid microwave. In some embodiments, at least one sensor 308 is inserted into a top port of the hybrid microwave to monitor conditions (e.g. temperature) within the microwave itself. The top ports may also be used for treating and/or analyzing off-gases that may be produced during treatment.

It should be understood that gaseous substances could be treated similarly to liquids in that they are fluidic substances. For example, in some embodiments the coil 300, the ports 302i/302ii, the pump system 304 and other related system 100 structures are used for moving gaseous material through the system.

FIG. 4 is a schematic of a gaseous waste treatment module 106 an integrated, hybrid microwave system 100, in accordance with an exemplary embodiment of the invention. As described elsewhere herein, the system 100 can be tailored for primarily treating gaseous materials and/or it could also be used for treating off-gases which are produced when solids and/or liquids are being treated by the system 100. In some embodiments of the invention, a retort 402 which contains a susceptor material 404 (which is irradiated by the microwave and which then applies heat to the gases flowing therethrough) is used to collect gases in the microwave, pass the gases over and/or through the susceptor material 404, and pass the treated gases on. Optionally, the treated gases exit the microwave at an outlet port 406. In some embodiments, gases which need additional processing are returned through the gaseous waste treatment module 106 using return tubing 410. Optionally, a valve or system of valves 408 controls gas flow within the module 106, for example to vent treated gas and/or to recycle gas which needs further treatment.

At least one sensor 412 is provided to the module 106 for monitoring characteristics of the gaseous materials, before and/or after treatment. Various characteristics can be qualitative relating to the treatment status of the gas and/or could involve physical characteristics like flow rate, density, pressure and other like factors.

While FIG. 4 shows a susceptor box 200 and tubing extending from the box 200 to the retort 402, in some embodiments of the invention, the retort 402 is connected directly to a coil 300 through which gaseous materials are flowing for treatment, where the gaseous materials are not merely off-gases.

In some embodiments, the module 106 is only partially within or is located entirely external to the hybrid microwave unit. For example, the return 410 could exit our of the top port 406 and re-enter the microwave unit at one or more of the ports 302i, 302ii, or even a different port.

Figure 5A:
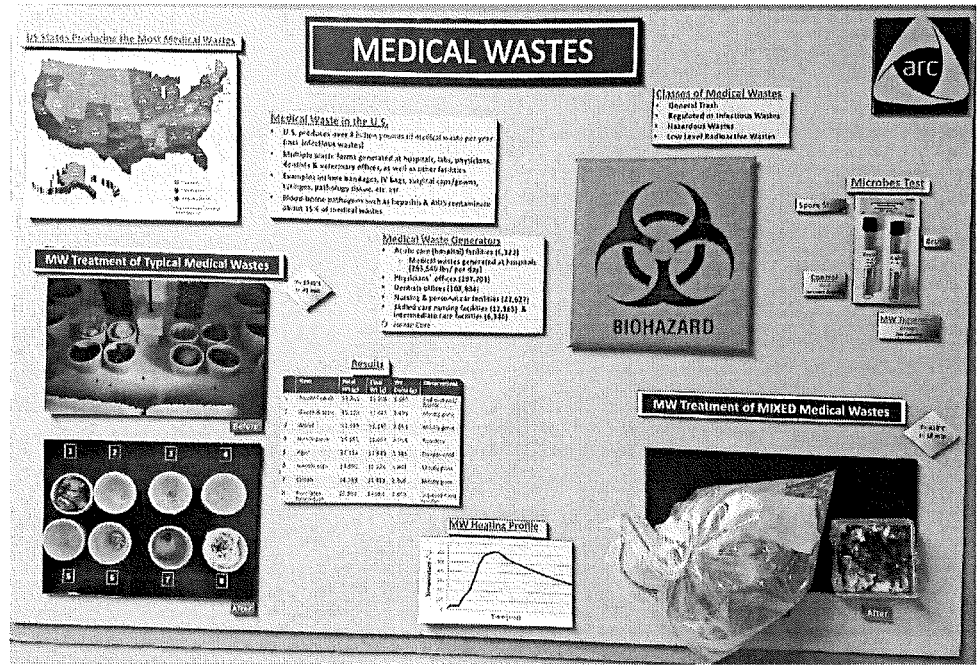
FIGS. 5A and 5B are images of actual treatment, and destruction/volume reduction of various medical wastes, in accordance with an exemplary embodiment of the invention; and, FIG. 6 is an image of hybrid microwave equipment, including the actual flow-through liquid treatment apparatus, in accordance with an exemplary embodiment of the invention.
Figure 5B:
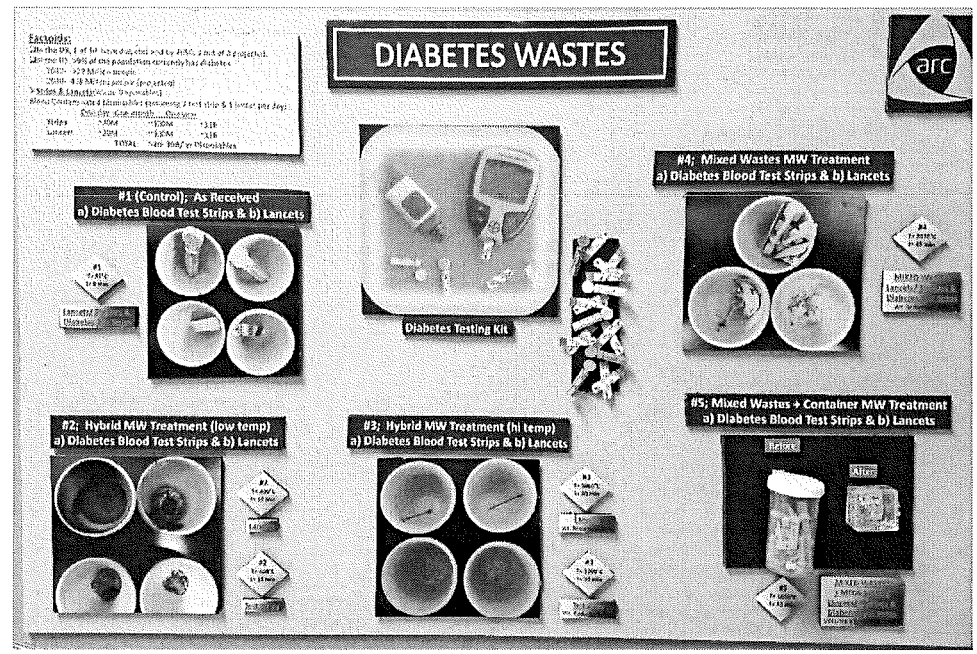

FIGS. 5A and 5B show images of pictures of treatment, destruction/volume reduction of various medical wastes, in accordance with an exemplary embodiment of the invention.

Figure 6:
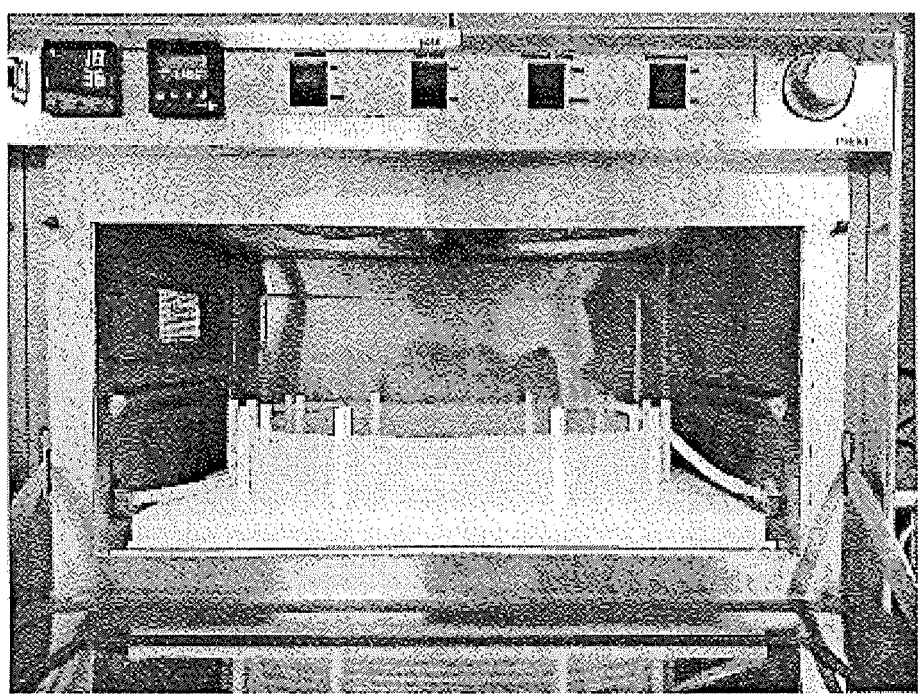

FIG. 6 is an image of hybrid microwave equipment, with tubing entering from the left (as viewed in the image), passing through the interior of the hybrid microwave and exiting to the right, wherein a flowing liquid is being treated by the system, in accordance with an exemplary embodiment of the invention.

As can be appreciated from the description of the invention herein, there are multiple usage scenarios for the disclosed waste treatment systems involving one or more of the solid waste material treatment module 102, the liquid waste material treatment module 104, and, the gaseous waste material treatment module 106, and related hardware (such as the controller 108).

For example, at least the liquid waste material treatment module 104 of the system 100 can be used for treatment and/or purification of water. With respect to third world country critical needs, this especially includes the two major areas of "safe drinking water" and "sanitation". These needs for developing countries are great and interrelated. The lack of sufficient safe drinking water and sanitation are the primary causes of a few alarming statistics, including:

a) Every 60 seconds, a child dies from water-related diseases;
b) >80% sewage in developing countries is discharged untreated, polluting rivers, lakes and water sources;
c) 2 Billion people globally drink water contaminated by feces and each year more than ½ Million die from related diarrhea issues; and,
d) Clean water is critical in improving sustainable food production in order to reduce poverty and hunger.

In some embodiments of the invention, the system 100 is used for filtering and pasteurization of moving liquids by hybrid microwave energy to make purified drinking water. In some embodiments of the invention, sanitation is improved by incorporating the systems 100 described herein into toilets, latrines or other outlets of human waste to provide hybrid microwaving to the human waste as it transits into the local sanitation system. In some embodiments, the treated human waste is recycled for other purposes, such as for fertilizer or even as an alternative energy source (optionally, powering the waste treatment system 100).

Another usage scenario includes using the system 100 to separate desirable reclaimable/recyclable materials from other materials, using for example any one of the solid, liquid or gaseous waste material treatment modules. For example, precious metals can be separated from plastic or other materials which have lower melting temperatures by applying heating and/or radiation from the hybrid microwave and related modules described herein.

Another usage scenario, for homeland security for example, includes using the system to de-nature and/or pasteurize and/or sanitize biohazardous, toxic, radioactive, medical and/or chemical wastes by running the material to be treated through one or more of the modules described herein.

A law enforcement or medical industry application of the system 100 is the destruction of illegal drugs or the safe disposal of expired or contaminated pharmaceuticals by running the material to be treated through one or more of the modules described herein.

In some embodiments of the invention, the system 100 is used to reduce waste material volume. For example, by passing waste material, especially solid, through the system 100 the material volume can be reduced significantly enabling easier storage, disposal and/or transport of the waste.

It is expected that during the life of a patent maturing from this application many relevant hybrid microwave technologies will be developed and the scope of the term hybrid microwave is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The term "plurality" means "two or more".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A treatment system, comprising at least one of:
    a solid waste material treatment module, configured to at least one of disinfect and sterilize materials for reuse and recycling, as well destroy waste materials and components;
    a liquid waste material treatment module; configured to treat a moving liquid stream and,
    a gaseous waste material treatment module, configured to treat gas streams from outside sources or off-gases generated from the other modules
    wherein the solid, liquid and gaseous waste material treatment modules are used separately or selectably interconnectable to each other in combination with a same hybrid microwave.

2. A comprehensive, modular treatment system using standard or alternative power sources,
    i) wherein a user is separated from the radiation, heat, off-gases and/or other potentially harmful substances or effects during system operation, and
    ii) wherein at least one of multiple forms of matter are treated with a same hybrid microwave, including
        a) solids;
        b) flowing liquids; and
        c) gases, including off-gases from a) and/or b).

3. A method of reclaiming materials, comprising: passing solid, liquid or gaseous waste through one or more of the treatment systems of claims 1-2.

4. A method of treating biohazardous, toxic, radioactive, medical and/or chemical wastes, comprising:
    passing the biohazardous, toxic, radioactive, medical and/or chemical wastes through one or more of the treatment systems of claims 1-2.

5. The method according to claim 4, further comprising decontaminating medical materials and equipment for reuse or recycling.

6. A method of pharmaceutical and/or illegal drug disposal, comprising; passing the pharmaceuticals and/or illegal drugs through one or more of the treatment systems of claims 1-2.

7. A method of reducing waste material volume, comprising: passing the waste through one or more of the treatment systems of claims 1-2.

8. Any one of the systems of claims 1-2, further comprising alternative power sources for powering at least the hybrid microwave including at least one of solar, wind, geothermal, hydroelectric, and/or organic waste.

9. Any one of the systems of claims 1-2, combined with at least one other of the systems of claims 1-2 at least one of serially and in parallel.

10. Any one of the systems of claims 1-2, further comprising at least one software-programmed controller adapted for at least one of tailoring ramp-up/ramp-down times, implementing radiation application profiles, implementing heat intensity application profiles, optionally in conjunction with one another, and controlling soaking cycle performance of the system.

11. A system according to claim 10, herein the controller is remotely located with respect to the hybrid microwave.

\* \* \* \* \*